United States Patent [19]

Speck et al.

[11] Patent Number: 4,832,884
[45] Date of Patent: May 23, 1989

[54] METHOD FOR MEASURING AND CONTROLLING THE CLOSING FORCE OF A PLASTIC INJECTION MOLDING MACHINE

[75] Inventors: Ruedi Speck, Netstal; Robert Weinmann, Weesen, both of Switzerland

[73] Assignee: Netstal-Maschinen AG, Switzerland

[21] Appl. No.: 933,628

[22] Filed: Nov. 21, 1986

[30] Foreign Application Priority Data

Nov. 29, 1985 [CH] Switzerland .................... 5093/85

[51] Int. Cl.$^4$ ............................................. B29C 45/66
[52] U.S. Cl. .................... 264/40.5; 425/149; 425/150; 425/162; 425/593
[58] Field of Search ............. 364/473, 476, 153; 264/40.1, 40.3, 40.5, 40.7; 425/135, 136, 137, 138, 145, 147, 149, 150, 151, 154, 155, 162, 593, 451.6

[56] References Cited

U.S. PATENT DOCUMENTS

| | | | |
|---|---|---|---|
| 3,642,405 | 2/1972 | Eggenberger et al. | 425/451.6 |
| 3,795,916 | 3/1974 | Wallace et al. | 364/153 |
| 4,060,362 | 11/1977 | Wilson, III | 425/149 |
| 4,297,901 | 11/1981 | Stroup et al. | 73/862.54 |

Primary Examiner—Jan H. Silbaugh
Assistant Examiner—Jill L. Heitbrink
Attorney, Agent, or Firm—McGlew & Tuttle

[57] ABSTRACT

When the mold of plastic injection molding machine is locked, the closing force (K) is measured at the knuckle joint system during a predetermined number of operating cycles (Z). A mean value is computed from these actual value measurements (Si) and if it is within a predetermined tolerance zone (T) around a set-point value (So), no control intervention takes place. But if this mean value is outside of the tolerance zone (T) but in a control zone (R) limited by alarm limits (A), a control intervention takes place by stepwise changing the installed height of the mold until the actual value measured after each operating cycle is again within the tolerance zone (T). The measurement is repeated over another operating period (B); if those measurements stay within the control zone (R), a new mean value is computed only at the end of this operating period and a corresponding decision is made whether or not a control intervention should take place.

4 Claims, 2 Drawing Sheets

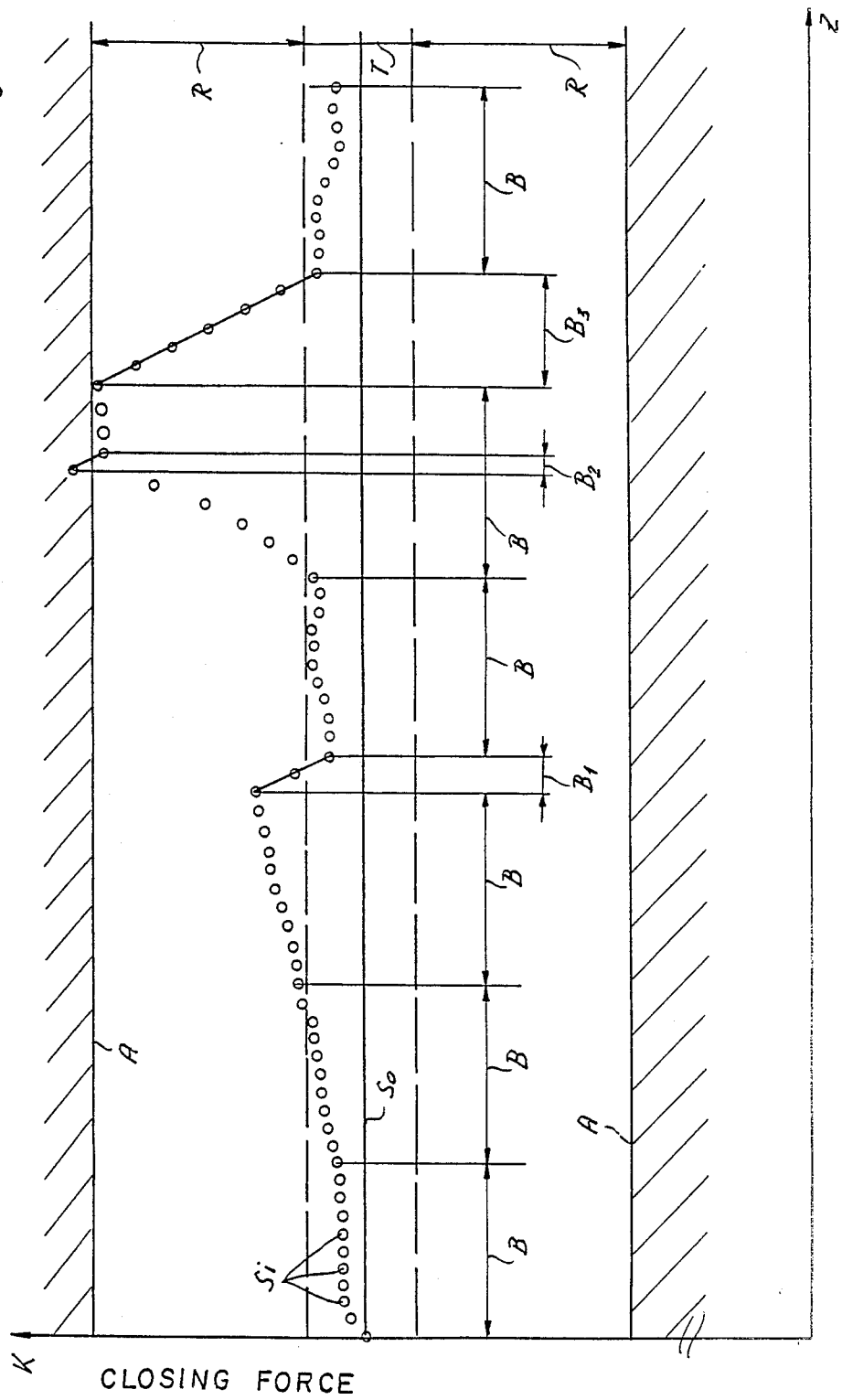

METHOD FOR MEASURING AND CONTROLLING THE CLOSING FORCE OF A PLASTIC INJECTION MOLDING MACHINE

FIELD AND BACKGROUND OF THE INVENTION

This invention relates, in general, to injection molding and, in particular, to a new and useful method and apparatus for measuring and controlling the closing force of a plastic injection molding.

The invention relates particularly to a method of measuring and controlling the closing force of a plastics injection molding machine having a centrally adjustable knuckle joint system serving for the generation of the closing force, and to a device for the execution of this method.

In one such method, known e.g. from the German disclosure 2,910,931, the actual closing force is measured for each operating cycle and compared with two preselected tolerance limits of the set-point value; if the actual value exceeds one or the other one of these tolerance limits, the mold height is changed by an appropriately controlled servomotor, i.e. the closing force for the next cycle. The change is made in predetermined, timed steps. This closing force control mode may not only lead to a multiplicity of control steps and it does not take into account whether only an exceptional deviation is involved or whether the closing forces of successive operating cycles exceed the tolerance zone indicate an actual trend.

SUMMARY OF THE INVENTION

In contrast thereto, the present invention suggests a method in which any accidental deviation of the closing force from the tolerance zone does not automatically have to lead to a closing force alteration and in which the decision wether or not to excercise a control and thus change the installation dimension of spacing between mold parts is not made after every operating cycle, whereby an undesirably high number of control interventions is prevented.

The method according to the invention is characterized in that, at least during a part of the operating time of the machine, the closing force is measured for each operating cycle of an operating period predetermined by the number of cycles and a mean value is computed from these measured values, and in that a control is exercised only when this mean value, in a closing force control zone, is outside a tolerance zone around the preset closing force set-point, the control being exercised in closing force altering steps, and a measurement beingtaken for every operating cycle following these altering steps, and the next operating period serving the determination of the mean value starting only when the measurement after a closing force altering step results in a value within the tolerance zone.

It presents no problem at all to apply this method during the entire operating time or only during the starting phase or only during the subsequent, normal operating phase (during which the thermal equilibrium is attained in the machine). It has proven to be advantageous to select a lower number of operating cycles per operating period of the starting phase than per operating period of the normal operating phase. This makes it possible to take into account closing force deviations from the set-point value which, during the starting phase, usually are much greater and follow each other more rapidly timewise.

Also, being a subject of the invention, the device for the execution of the method is of relatively simple design. It contains a measuring device to measure the actual closing force, its output being connected via an amplifier to a computer; and a position measuring device, also connected to the computer, to emit a signal corresponding to the position of the movable mold carrier. The computer output is connected to a servomotor to adjust the mold height; and a programming device, connected to the computer, being provided, on which the number of cycles per operating period, the size of thetolerance zone, the size of the closing force altering steps and the time when the control intervention by the servomotor takes place are settable.

Accordingly, it is an object of the invention to provide an improved means for measuring the closing force which is applied to a movable mold half to close it in respect to a fixed mold half and which includes an amplifier connected to the measuring device which feeds the information to a computer which has a programmer set to operate a device for shifting the fixed mold parts or mold carrier, the moving device comprising a servomotor which is connected to the computer which has an input or programmer which is fed the information concerning the number of cycles per each operating period, the size of the closing force altering steps and the time when the control intervention by the servomotor is to take place.

A further object of the invention is to provide a method of measuring and controlling the closing force of a plastic injection molding machine which has a centrally adjustable knuckle joint system which serves for the generation of the closing force of the mold which comprises measuring the closing force for each operating cycle during an operating period, computing a mean value from the measured value, exercising a control on the closing of the mold only when the mean value in the closing force control zone is outside a tolerance zone beyond a preset point of the closing force and wherein the control is exercised in a closing force altering step and a measurement is taken during every operating cycle following the altering steps and carrying out a next operating period serving the determination of the mean value only after a measurement after the closing force offering step results in a value within the tolerance zone.

A further object of the invention is to provide a device for measuring and controlling the closing force of the plastic injection molding machine which is simple in design, rugged in construction and economical to manufacture.

BRIEF DESCRIPTION OF THE DRAWINGS

In the Drawings:

FIG. 2 is an operating diagram of the measuring and controlling device according to FIG. 1.

DESCRIPTION OF THE PREFERRED EMBODIMENTS

Figure 1:
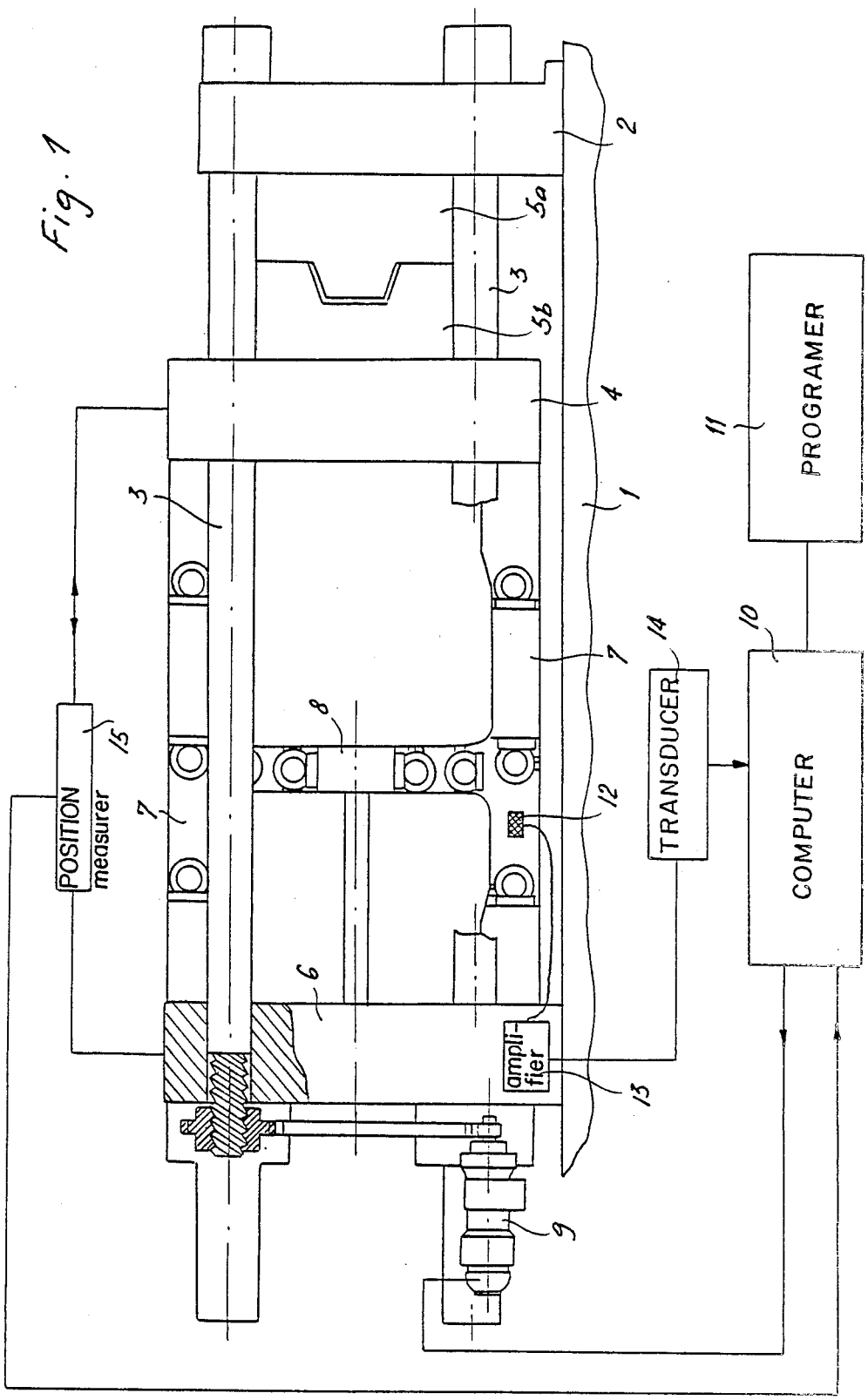
FIG. 1 is a schematic plan of a plastics injection molding machine with a closing force measuring and controlling device according to the invention.

Referring to the drawings, in particular, the invention embodied therein comprises a method of measuring and controlling the closing force of a plastic injection molding machine having a frame or support 1 in which there is mounted a mold carrier plate 2 having cross bars or guides 3 for a movable mold part carrier plate 4 carrying a movable mold part 5b which is closeable in respect to a fixed mold part 5a of the mold carrier plate 2.

The plastics injection molding machine schematically shown in FIG. 1 has a mold carrier plate 2 supported by the machine frame 1 and a mold carrier plate 4 mounted so as to be movable lengthwise on cross bars 3. The two mold carrier plates 2 and 4 each carry one mold half 5a and 5b, respectively. The movable mold carrier plate 4 is connected via a knuckle or toggle joint system 7 with a hinge plate 8 to a support 6 which is mounted to the frame 1 and to which a servomotor 9 is mounted.

This injection molding machine design, known per se, makes possible by means of the servomotor 9 the central positioning of the support 6 and, hence, an adjustment of the closing force generated in the closing position of the mold 5a, 5b by means of the knuckle joint system which may be driven in a manner not detailed. The servomotor 9 is connected for this purpose to the output of a computer which generates an activating signal and is programmable by means of a programming device 11. Disposed on all toggle levers of the knuckle joint system 7 are measuring devices or elongation sensors 12 whose signals are averaged and fed via a preamplifier 13 and a transducer 14 to the computer 10. Between the stationary support 6 and the movable mold carrier plate 4 is further mounted a distance measuring instrument 15 which generates a signal corresponding to the momentary position of the movable mold carrier plate 4, which signal is also fed to the computer 10.

In the present example, it is with this arrangement measuring and control devices 9 to 15 that the measuring and controlling method described below with reference to FIG. 2 and fixed by the programming device 11 is executed.

It is assumed that an elementary machine setting has taken place on the basis of the given machine data and the therefrom derived set-point value S of the closing force K when the mold is locked. If the machine is now started, it will attain its thermal equilibrium only after a certain starting phase which may last an hour longer. This starting phase, therefore, comprises a relatively large number of working cycles Z (closing and locking the mold), keeping the mold in locked position and opening the mold), during which the closing force K can change relatively often regarding the set-point value So towards the one and/or the other side. Since it is virtually impossible, and also not necessary, to maintain the exact, computed set-point value So of the closing force S, a tolerance zone T commensurate with the prevailing conditions is assumed, which includes those closing force deviations of the actual value Si of the closing force S from the set-point value So which are to be permissible without control interventions. On the other hand, a control intervention should not occur either if the actual value Si exceeds this tolerance zone only once in a larger number of cycles Z, because such exceptional deviations, unless they exceed a certain limit, are also tolerable. But in order not to exceed this limit, the control zone R which extends along both sides of the tolerance T, and within which the closing force is to be returned into the tolerance zone by central positioning without endangering the machine, is bounded by an alarm limit A. If the actual Si of the closing force S exceeds these limits and continues to do so despite immediate control interventions, an alarm is triggered and/or the machine is shut off.

Now, the above conditions are arrived at only through the following measures entered in the programming device: After each operating cycle (with mold locked) the actual value Si is measured at the knuckle to toggle joint 7 and the signal corresponding to the averaged value is fed to the computer. After an operating period B, determined by the programming device 11 and defined by a predetermined number of cycles, a mean value, e.g. the arithmetic mean, is computed from the stored actual Si values of this period. If this mean value is within the tolerance zone T, no control intervention will take place, and a new operating period Ba of the same number of cycles begins with individual measurement of the actual values, computation of a mean value and decision as to whether or not a control intervention should take place. It may seem from the operating state indicated in FIG. 2 that the last measurements taken in the second operating period B (from the left in FIG. 2) are slightly outside of the tolerance T, but this does not yet lead by any means to the mean value of the measurements taken in all cycles of this period being outside this tolerance zone T so that no control intervention takes place now either. If it now turns out that the mean actual value of the operating period B next following (third from the left in FIG. 2) is indeed outside the tolerance zone T, but inside a control zone designated R, the computer 10 will command the servomotor 9 to intervene. This servomotor 9 subsequently moves the support 6 by an amount fixed by the programming device 11 in the desired sense of change, whereby the installation dimension of spacing between mold parts (daylight) of the mold and, hence, the closing force for the next following operating cycle are changed accordingly. It should be noted that this closing force modification takes place when the closing device is statically relaxed and to particular advantage when it is dynamically stressed, i.e. during the opening or closing motion of the mold, depending on whether the closing force is to be reduced (i.e. out of the upper control zone R in FIG. 2) or increased (i.e. out of the lower control zone R in FIG. 2) and thus returned into the tolerance zone T. The correct time when to emit the signal for the control intervention is furnished by the distance measuring instrument 15. The altering steps performed by the servomotor 9 due to the signal from the computer are smaller in the example shown than the band width of the tolerance zone T. If the measurement after the operating cycle following the control intervention (indicated in FIG. 2 in the area $B_1$) shows that the actual value still is outside of the tolerance T, another control intervention takes place by one (or more)altering steps until the new measurement shows that the actual value is within the tolerance zone T. It is only now that a new operating period B with a preset number of cycles begins again, whereupon, analogous to the method described at the outset, the mean value of the actual values Si of this period is monitored as to its position within or outside of the tolerance zone T.

It was assumed in the foregoing that operating periods B of the starting phase are involved. In that case, the number of operating cycles per operating period is relatively small and comprises only 10 or 20 cycles, for example. How many operating periods are part of the starting phase depends, of course, on how fast the machine attains its thermal equilibrium; the number of these starting periods may be between 10 and 20, for instance. Therefore, switching to normal operation as programmable through the device 11 occurs on the basis of empirical values. But this switching only means that the number of operating cycles needed to form a mean actual closing force value is increased considerably, e.g. to 100 and more cycles.

The method itself is continued in the same manner as described above.

Now, if it turns out (whether in the starting phase or in the normal operating phase at thermal equilibrium), that an actual value measured during an operating period, as indicated in the area $B_2$ in FIG. 2, is outside of the control zone R, fixed in the program, a control intervention takes place immediately, without waiting for the end of the operating period and computing a mean value. If no success is achieved in returning the actual value of the next following operating cycle into the control zone R through one or just a few, normally e.g. 5, altering steps thus initiated, an alarm signal (visible or audible) is emitted and/or the machine is shut off. But if this actual value (and the succeeding ones) are again within the control zone R, as indicated in the area $B_2$ in FIG. 2, the current operating period B is considered not interrupted, i.e. a mean value is computed again only at the end of the operating period to decide whether or not a control intervention should take place. But since this mean value is outside of the tolerance zone T in virtually every case, a control intervention occurs immediately and subsequently more of them (as indicated in the area $B_3$ in FIG. 2), until the respectively measured actual closing force is again within the tolerance zone T. It is only thereafter that a new operating period B of the preset number of cycles is started.

The above described method makes it possible to get by with relatively few control interventions in both the starting phase and the normal operating phase (after reaching the thermal equilibrium).

It has turned out in practice that the tolerance zone T can be beteen $\pm.5$ to 2% of the set-point value So of the closing force and that the alarm limits limiting the control zone R outwardly can assume about $\pm 2$ to 100% of the set-point value. The altering steps effected by the servomotor advantageously amount to at least half the range of the tolerance zone and expediently are between $\pm.5$ to .9% of the set-point value. Of course, these altering steps, instead of being fixed, may also be variable, e.g. as a function of the magnitude of the computed deviation; their duration in time, however, must always be less than the mold closing or opening time of an operating cycle. As already mentioned, the mean of the actual values measured may be the arithmetic mean of the actual values measured during one operating period. But is is also possible to correct this value by including the mean value of the preceding operating period in order to take into account also the trend of the closing force deviations from the set-point manifesting itself in the successive operating periods. However, other methods of determining the mean value are imaginable also; for instance, the mean value in the middle between the greatest and the smallest closing force deviation from the set-point within an operating period could also be utilized as the mean value governing the control intervention decision.

It is assumed in the foregoing that the method according to the invention is carried out in both the starting phase and the normal operating phase at thermal equilibrium. But it is understood that it is also possible to execute this measuring and controlling method during the one or the other of these phases only.

What is claimed is:

1. A method of measuring and controlling the closing force of a plastic injecting molding machine during operation having a first mold part and a second mold part and having a centrally adjustable toggle joint system serving the generation of a closing force on the first mold part and the second mold part, the injection molding machine operating in cycles including the opening and closing of the first and second mold parts, a predetermined number of cycles constituting an operating period, comprising the steps of:

measuring the closing force for each cycle during each of the operating periods;

computing the measured force mean value based on the measured force of the cycles during each of the operating periods;

determining whether the mean value is within a tolerance zone which is a range above and below a preselected closing force set point and determining whether the mean value is within a control zone which represents closing force values above and below the tolerance zone;

controlling the closing force of the mold when the mean value is determined to be within the control zone by altering the spacing between the first and second mold parts by a predetermined amount constituting a control step;

measuring the closing force for each cycle following each control step;

repeating the control step when the closing force measured for each cycle following each control step is outside of the tolerance zone;

repeating the steps of measuring the closing force and repeating a mean value computation only after a measurement following the control steps results in a value within the tolerance zone.

2. A method according to claim 1, wherein: the steps of measuring the closing force includes measuring the forces on toggle levers forming toggle joint system, and computing the measured force based on the measurement of the forces of all the toggle levers.

3. A method according to claim 1, wherein: said control step occurs only after an initial start up phase is completed.

4. A method according to claim 1, wherein: the control step is immediately initiated when the measured force is outside the control zone and outside the tolerance zone.

* * * * *